US010199848B2

(12) United States Patent
Patnaik et al.

(10) Patent No.: US 10,199,848 B2
(45) Date of Patent: Feb. 5, 2019

(54) APPARATUSES, METHODS, AND SYSTEMS FOR ENABLING HIGHER CURRENT CHARGING OF UNIVERSAL SERIAL BUS (USB) SPECIFICATION REVISION 2.0 (USB 2.0) PORTABLE ELECTRONIC DEVICES FROM USB 3.X HOSTS

(71) Applicant: QUALCOMM Incorporated, San Diego, CA (US)

(72) Inventors: Devdutt Patnaik, San Diego, CA (US); Jay Yu Jae Choi, San Diego, CA (US); Terrence Brian Remple, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/444,443

(22) Filed: Jul. 28, 2014

(65) Prior Publication Data

US 2016/0028250 A1 Jan. 28, 2016

(51) Int. Cl.
*G06F 1/26* (2006.01)
*G06F 13/26* (2006.01)
(Continued)

(52) U.S. Cl.
CPC .............. *H02J 7/007* (2013.01); *G06F 1/266* (2013.01); *H02J 7/0004* (2013.01);
(Continued)

(58) Field of Classification Search
CPC .......... G06F 1/08; G06F 1/188; G06F 1/1689; G06F 2213/3812; G06F 3/00; G06F 12/26; G06F 13/40
(Continued)

(56) References Cited

U.S. PATENT DOCUMENTS 5,414,833 A * 5/1995 Hershey ................ G06F 21/564
713/164
5,915,088 A * 6/1999 Basavaiah ......... G06F 15/17381
712/28
(Continued)

FOREIGN PATENT DOCUMENTS

WO 0157679 A2 8/2001

OTHER PUBLICATIONS

International Search Report and Written Opinion for PCT/US2015/042006, dated Sep. 17, 2015, 11 pages.
(Continued)

*Primary Examiner* — Farley Abad
*Assistant Examiner* — Getente A Yimer
(74) *Attorney, Agent, or Firm* — Withrow & Terranova, PLLC

(57) ABSTRACT

Apparatuses, methods, and systems for enabling higher current charging of Universal Serial Bus (USB) Specification Revision 2.0 (USB 2.0) portable electronic devices from USB 3.x hosts are disclosed. In one aspect, a USB 2.0 controller is provided in a USB 2.0 portable device. A USB 3.x controller is provided in a USB 3.x host. The USB 2.0 controller is configured to draw a higher charging current than specified in USB 2.0 for the USB 2.0 portable device over a USB 2.0 cable. In order to draw the higher charging current without violating USB 2.0, the USB 2.0 controller is configured to use one or more reserved elements in an existing USB 2.0 descriptor(s) or bitmap(s) to indicate a higher charging current request from the USB 2.0 controller.

30 Claims, 10 Drawing Sheets

(51) Int. Cl.
*H02J 7/00* (2006.01)
*G06F 13/42* (2006.01)

(52) U.S. Cl.
CPC ........ *H02J 7/0052* (2013.01); *G06F 13/4282* (2013.01); *G06F 2213/0042* (2013.01); *H02J 2007/0062* (2013.01)

(58) Field of Classification Search
USPC .............................. 710/16, 10, 22, 104, 313
See application file for complete search history.

(56) References Cited

U.S. PATENT DOCUMENTS

| | | | | |
|---|---|---|---|---|
| 6,131,113 | A * | 10/2000 | Ellsworth | G06F 9/52 709/213 |
| 6,946,817 | B2 | 9/2005 | Fischer et al. | |
| 7,159,132 | B2 | 1/2007 | Takahashi et al. | |
| 8,185,759 | B1 * | 5/2012 | Li | G06F 13/105 710/305 |
| 8,661,268 | B2 | 2/2014 | Brooks et al. | |
| 8,671,291 | B2 | 3/2014 | Ballantyne et al. | |
| 2003/0187814 | A1 * | 10/2003 | Patel | G06F 9/3826 |
| 2006/0047903 | A1 * | 3/2006 | Passerini | G06F 3/0622 711/114 |
| 2006/0212607 | A1 * | 9/2006 | Riethmuller | G06F 9/4812 710/6 |
| 2009/0100275 | A1 * | 4/2009 | Chang | G06F 1/266 713/300 |
| 2010/0064148 | A1 * | 3/2010 | Ho | H02J 1/00 713/300 |
| 2010/0303157 | A1 * | 12/2010 | Abe | H04N 21/426 375/240.25 |
| 2011/0271122 | A1 | 11/2011 | King | |
| 2011/0276819 | A1 * | 11/2011 | Dong | G06K 19/0701 713/340 |
| 2012/0159008 | A1 * | 6/2012 | Park | G06F 13/387 710/15 |
| 2012/0260017 | A1 * | 10/2012 | Mine | G06F 9/544 710/308 |
| 2013/0132614 | A1 * | 5/2013 | Bajpai | G06F 8/654 710/10 |
| 2013/0151731 | A1 | 6/2013 | Lai et al. | |
| 2013/0238819 | A1 | 9/2013 | Oljaca et al. | |
| 2014/0059361 | A1 * | 2/2014 | Tajima | G06F 1/266 713/300 |
| 2015/0074312 | A1 * | 3/2015 | Barus | G06F 13/4068 710/306 |

OTHER PUBLICATIONS

Compaq et al., "Universal Serial Bus Specification," XP-002412161, Revision 2.0, Apr. 27, 2000, 147 pages.
Second Written Opinion for PCT/US2015/042006, dated Jun. 17, 2016, 5 pages.
International Preliminary Report on Patentability for PCT/US2015/042006, dated Oct. 4, 2016, 32 pages.

* cited by examiner

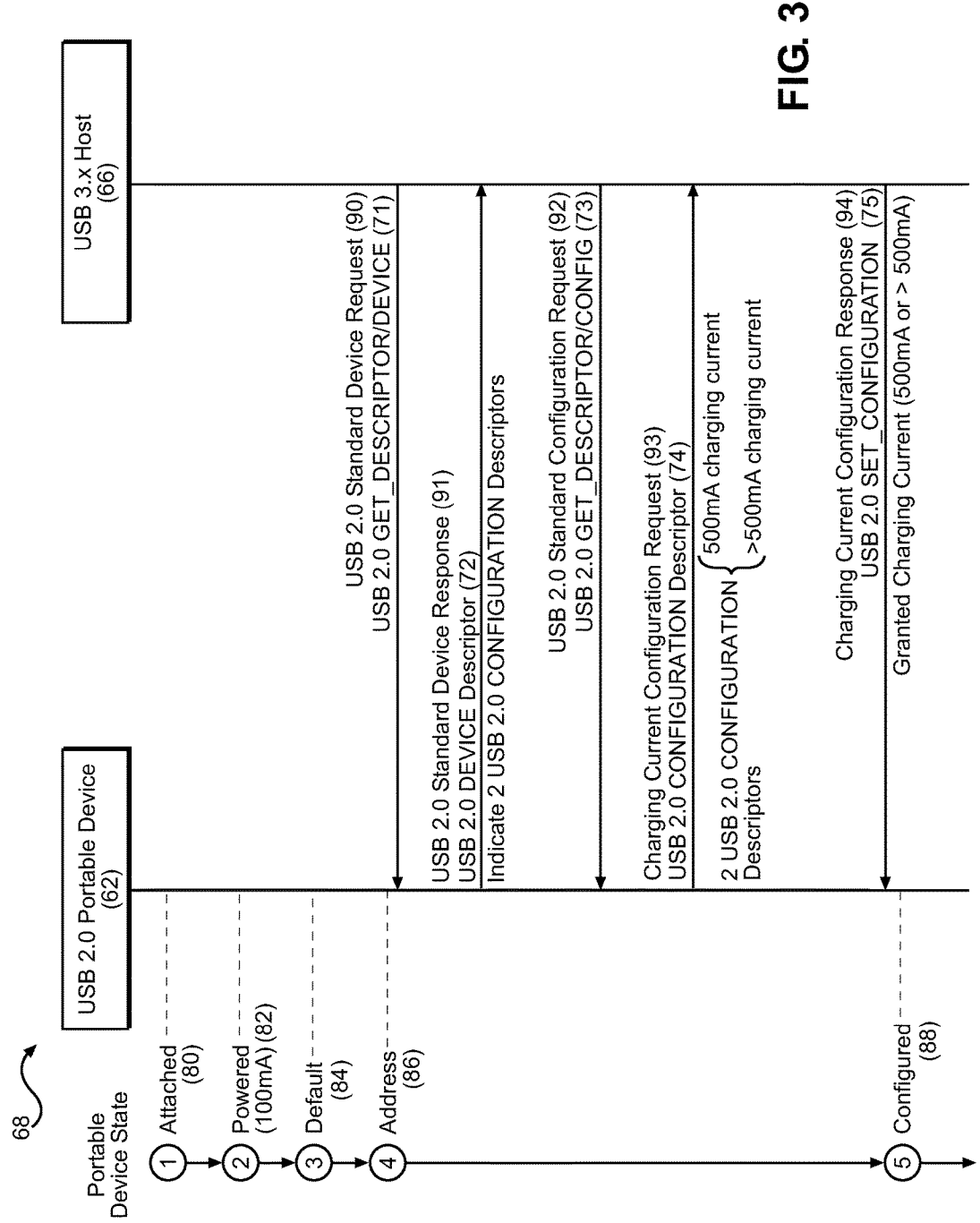

USB 2.0 DEVICE Descriptor Format (98)

| Offset | Field | Size | Value | Discription |
|---|---|---|---|---|
| 0 | bLength | 1 | Number | Size of this descriptor in bytes |
| 1 | bDescriptorType | 1 | Constant | DEVICE descriptor type (= 1) |
| 2 | bcdUSB | 2 | BCD | USB Spec release number |
| 4 | bDeviceClass | 1 | Class | 00h means each interface defines its own class FFh means vendor-defined class Any other value must be a class code |
| 5 | bDeviceSubClass | 1 | SubClass | SubClass Code assigned by USB-IF |
| 6 | bDeviceProtocol | 1 | Protocol | Protocol Code assigned by USB-IF |
| 7 | bMaxPacketSize0 | 1 | Number | Max packet size for endpoint 0. Must be 8, 16, 32 or 64 |
| 8 | idVendor | 2 | ID | Vendor ID - must be obtained from USB-IF |
| 10 | idProduct | 2 | ID | Product ID - assigned by the manufacturer |
| 12 | bcdDevice | 2 | BDC | Device release number in binary coded decimal |
| 14 | iManufacturer | 1 | Index | Index of string descriptor describing manufacturer - set to 0 if no string |
| 15 | iProduct | 1 | Index | Index of string descriptor describing product - set to 0 if no string |
| 16 | iSerialNumber | 1 | Index | Index of string descriptor describing device serial number - set to 0 if no string |
| 17 | bNumConfigurations | 1 | Number | Number of possible configurations |

FIG. 4A

USB 2.0 CONFIGURATION Descriptor Format (99)

| Offset | Field | Size | Value | Discription |
|---|---|---|---|---|
| 0 | bLength | 1 | Number | Size of this descriptor in bytes |
| 1 | bDescriptorType | 1 | Constant | CONFIGURATION descriptor type (= 2) |
| 2 | wTotalLength | 2 | Number | Total number of bytes in this descriptor and all the following descriptors. |
| 3 | bNumInterfaces | 1 | Number | Number of interfaces supported by this configuration |
| 4 | bConfigurationValue | 1 | Number | Value used by Set Configuration to select this configuration |
| 5 | iConfiguration | 1 | Index | Index of string descriptor describing configuration - set to 0 if no string |
| 6 | bmAttributes | 1 | Bitmap | D7: Must be set to 1<br>D6: Self-powered<br>D5: Remote Wakeup<br>D4...D0: Set to 0 |
| 7 | bMaxPower | 1 | mA | Maximum current drawn by device in this configuration. |

FIG. 4B

| D7 | D6 | D5 | D4 | D3 | D2 | D1 | D0 |
|---|---|---|---|---|---|---|---|
| | | | | Request for 1500 mA Charge Current | Request for 900 mA Charge Current | Remote Wakeup | Self Powered |
| D15 | D14 | D13 | D12 | D11 | D10 | D9 | D8 |
| | | | | | | | |

Information Returned by a GetStatus() Request to a Device (105)

Reserved (Reset to Zero) (spans D7–D4)
Reserved (Reset to Zero) (spans D15–D8)

FIG. 7

Standard Feature Selector Descriptor (106)

| Feature Selector (107) | Recipient | Value (108) |
|---|---|---|
| DEVICE_REMOTE_WAKEUP | Device | 1 |
| END_POINT_HALT | Endpoint | 0 |
| TEST_MODE | Device | 2 |
| HIGH_CURRENT_CHARGING_MODE_X | Device | ≥ 3 |

APPARATUSES, METHODS, AND SYSTEMS FOR ENABLING HIGHER CURRENT CHARGING OF UNIVERSAL SERIAL BUS (USB) SPECIFICATION REVISION 2.0 (USB 2.0) PORTABLE ELECTRONIC DEVICES FROM USB 3.X HOSTS

BACKGROUND

I. Field of the Disclosure

The technology of the disclosure relates generally to charging a battery of portable electronic devices over a Universal Serial Bus (USB) cable connected to a USB host.

II. Background

Portable electronic devices, such as smartphones, tablets, laptop computers, and the like, can be powered by rechargeable batteries. These rechargeable batteries require periodic recharging. Universal Serial Bus (USB) is an industry standard that defines cables, connectors, and communications protocols for data and power transfers among personal computers and electronic devices. Ports can be used for both data transfer ports as well as charging ports to charge rechargeable batteries of portable electronic devices.

In this regard, FIG. 1 illustrates a physical connectivity between a USB Specification Revision 2.0 (USB 2.0) controller 10 in a USB 2.0 portable electronic device 12 ("portable device 12") and a USB 3.x controller 14 in a USB 3.x host 16. The USB 2.0 controller 10 and the USB 3.x controller 14 are controlled by a USB 2.0 software driver 11 and a USB 3.x software driver 15, respectively. On one end, the USB 2.0 portable device 12 is embedded with a USB 2.0 micro-B receptacle 18. On the other end, the USB 3.x host 16 exposes a USB 3.x enhanced SuperSpeed standard-A receptacle 20. A detachable USB 2.0 cable 22, with a USB 2.0 micro-B plug 24 on one end and a USB 2.0 standard-A plug 26 on the other end, connects the USB 2.0 portable device 12 to the USB 3.x host 16. The USB 2.0 cable has a VBUS conductor, a GND conductor, a D− conductor, and a D+ conductor. The USB 2.0 micro-B receptacle 18 has a VBUS pin 28(1), a GND pin 30(1), a D− pin 32(1), and a D+ pin 34(1). The VBUS pin 28(1) and the GND pin 30(1) are used for charging, while the D− pin 32(1) and the D+ pin 34(1) are used for protocol handshakes and data transfer. The USB 3.x enhanced SuperSpeed standard-A receptacle 20 has a USB 2.0 interface 36 and a USB 3.x SuperSpeed interface 38. The USB 2.0 interface 36 has a VBUS pin 28(2), a GND pin 30(2), a D− pin 32(2), and a D+ pin 34(2). The USB 3.x SuperSpeed interface 38 has additional pins, namely a SSTX− pin 40, a SSTX+ pin 42, a SSRX− pin 46, and a SSRX+ pin 48. The SSTX− pin 40 and the SSTX+ pin 42 are used for SuperSpeed transmissions, while the SSRX− pin 46 and the SSRX+ pin 48 are used for SuperSpeed receptions.

The USB 2.0 portable device 12 in FIG. 1 is allowed to draw up to 500 mA charging current from the USB 3.x host 16 as a connected standard downstream port (SDP) according to Battery Charging Specification 1.2 (BC1.2). By means of hardware-based mechanism specified in USB 2.0, the USB 2.0 controller 10 presents itself as a USB 2.0 compatible device by pulling the D+ pin 34(1) HIGH. The USB 3.x controller 14 then detects the USB 2.0 portable device 12 as a USB 2.0 compatible device and selects the operating mode of the USB 2.0 portable device 12 according to USB 2.0. USB 2.0 provides for standard message descriptors to be exchanged between USB devices and hosts for charging purposes. Thus, the USB 3.x controller 14 will allow the USB 2.0 portable device 12 to draw up to 500 mA according to BC1.2 even though the USB 2.0 cable 22 is capable of safely carrying more current. However, if the USB 2.0 portable device 12 was instead a USB 3.x compatible device connected to the USB 3.x host 16 with a USB 3.x cable (not shown), the USB 3.x controller 14 would allow the USB 2.0 portable device 12 to draw up to 900 mA for faster charging time according to BC1.2.

SUMMARY OF THE DISCLOSURE

Aspects disclosed in the detailed description include apparatuses, methods, and systems for enabling higher current charging of Universal Serial Bus (USB) Specification Revision 2.0 (USB 2.0) portable electronic devices ("USB 2.0 portable device") from USB 3.x hosts. In aspects disclosed herein, it is desired to allow a USB 2.0 portable device connected to a USB 3.x host by a USB 2.0 cable, to draw more charging current than specified under USB 2.0 for the USB 2.0 portable device. A USB 2.0 cable is capable of safely carrying more current than the specified current limit in USB 2.0. However, it is also desired that USB 2.0 portable device remain compliant with USB 2.0 for compatibility and interoperability reasons. For the USB 2.0 portable device to remain compliant with USB 2.0, it is desired that no USB 2.0 data structure formats used to exchange information between the USB 2.0 portable device and the USB 3.x host be altered to enable a higher charging current for USB 2.0 portable electronic devices. Otherwise, such may result in the USB 2.0 portable device being incompatible with USB 2.0 and unable to pass USB 2.0 compliance tests required for USB 2.0 certification.

In this regard, in aspects disclosed herein, a USB 2.0 controller with a modified USB 2.0 software driver ("USB 2.0 controller") is provided in the USB 2.0 portable device. A USB 3.x controller with a modified USB 3.x software driver ("USB 3.x controller") is provided in the USB 3.x host. The USB 2.0 controller and the USB 3.x controller are compatible with USB 2.0 and USB 3.x, respectively. In certain aspects, to allow the USB 2.0 portable device to request a higher charging current from the USB 3.x host than specified in USB 2.0 over a USB 2.0 cable, without supporting a new data structure not provided in USB 2.0, the USB 2.0 controller is configured to be capable of requesting a higher charging current from the USB 3.x host in one or more reserved elements in an existing USB 2.0 data structure(s) (e.g., a fixed data structure like a descriptor) in response to a USB 2.0 Standard Device Request received from the USB 3.x controller. The USB 3.x controller is configured to receive and recognize a request for a higher charging current in a reserved element(s) in the USB 2.0 data structure(s) received from the USB 2.0 controller, and in turn provide the higher charging current to the USB 2.0 portable device.

In this regard in one aspect, a USB 2.0 controller is provided in a USB 2.0 portable device. The USB 2.0 controller is configured to detect a connected USB controller in a USB host over a USB 2.0 cable. The USB 2.0 controller is also configured to send a request in at least one reserved element of at least one USB 2.0 data structure to the USB host over the USB 2.0 cable to draw a higher charging current than a maximum charging current specified in USB 2.0 for a USB 2.0 portable device over the USB 2.0 cable. The USB 2.0 controller is also configured to receive a response from the USB host indicating whether the request to draw the higher charging current is permitted. If the request to draw the higher charging current is permitted, the USB 2.0 controller is configured to draw the higher charging current over the USB 2.0 cable from the host.

In another aspect, a method of a USB 2.0 portable device drawing a higher charging current from a USB 3.x host is provided. The method comprises detecting a connected USB controller in a USB host over a USB 2.0 cable. The method also comprises sending a request to the USB host over the USB 2.0 cable to draw a higher charging current than a maximum charging current specified in USB 2.0 for a USB 2.0 portable device over the USB 2.0 cable in at least one reserved element of at least one USB 2.0 data structure. The method further comprises receiving a response from the USB host indicating whether the request to draw the higher charging current is permitted and drawing the higher charging current over the USB 2.0 cable from the USB host if the request to draw the higher charging current is permitted.

In an additional aspect, a system for charging a USB 2.0 portable device from a USB 3.x host is provided. The system comprises a USB 2.0 portable device, a USB 3.x host, and a USB 2.0 cable. The USB 2.0 portable device comprises a USB 2.0 controller and a USB 2.0 receptacle. The USB 2.0 controller is configured to detect a connected USB controller in a host over a USB 2.0 cable. The USB 2.0 controller is also configured to send a request to the connected USB controller over the USB 2.0 cable to draw a higher charging current than a maximum charging current specified in USB 2.0 for the USB 2.0 portable device over the USB 2.0 cable in at least one reserved element of at least one USB 2.0 data structure. The USB 2.0 controller is further configured to receive a response from the connected USB controller indicating whether the request to draw the higher charging current is permitted and draw the higher charging current over the USB 2.0 cable from the USB host if the request to draw the higher charging current is permitted. The USB 2.0 receptacle is configured to engage a first USB 2.0 plug attached to the USB 2.0 cable for connecting to the USB host. The USB 3.x host comprises a USB 3.x controller. The USB 3.x controller is configured to detect the USB 2.0 controller in the USB 2.0 portable device over the USB 2.0 cable. The USB 3.x controller is also configured to receive the request from the USB 2.0 controller over the USB 2.0 cable to draw the higher charging current than the maximum charging current specified in USB 2.0 for the USB 2.0 portable device over the USB 2.0 cable in the at least one reserved element of the at least one USB 2.0 data structure. The USB 3.x controller is further configured to send a response to the USB 2.0 controller indicating whether the request to draw the higher charging current is permitted and provide the higher charging current over the USB 2.0 cable to the USB 2.0 portable device if a grant to draw the higher charging current is accepted. A USB 3.x receptacle is configured to engage a second USB 2.0 plug attached to the USB 2.0 cable for connecting to the USB 2.0 portable device. The USB 2.0 cable comprises the first USB 2.0 plug on one end of the USB 2.0 cable and the second USB 2.0 plug on another end of the USB 2.0 cable.

BRIEF DESCRIPTION OF THE FIGURES

FIG. 3 is a flowchart illustrating an exemplary signaling flow of USB 2.0 control messages and USB 2.0 descriptors carried as payloads of USB 2.0 control messages of a USB 2.0 portable device involving requesting to draw a higher charging current than the maximum charging current specified in USB 2.0 from a connected USB 3.0 host;

FIG. 4A is a table illustrating an exemplary format of a USB 2.0 DEVICE descriptor that can be used by the USB 2.0 controller in FIG. 2 to request to draw a higher charging current from the USB 3.x controller in FIG. 2;

FIG. 4B is a table illustrating an exemplary format of a USB 2.0 CONFIGURATION descriptor that has one or more reserved elements that can be used by the USB 2.0 controller in FIG. 2 to request to draw a higher charging current from the USB 3.x controller in FIG. 2;

FIG. 7 is a block diagram illustrating an exemplary structure and encoding of a data structure returned by the USB 2.0 controller in FIG. 2 in response to a USB 2.0 GET_STATUS Request sent by the USB 3.x controller in FIG. 2;

FIG. 8 is a block diagram illustrating an exemplary structure and encoding of a USB 2.0 SET_FEATURE control message that has one of more reserved elements configured to be used by the USB 3.x controller in FIG. 2 to grant the higher charging current requested by the USB 2.0 controller in FIG. 2.

DETAILED DESCRIPTION

Figure 1:
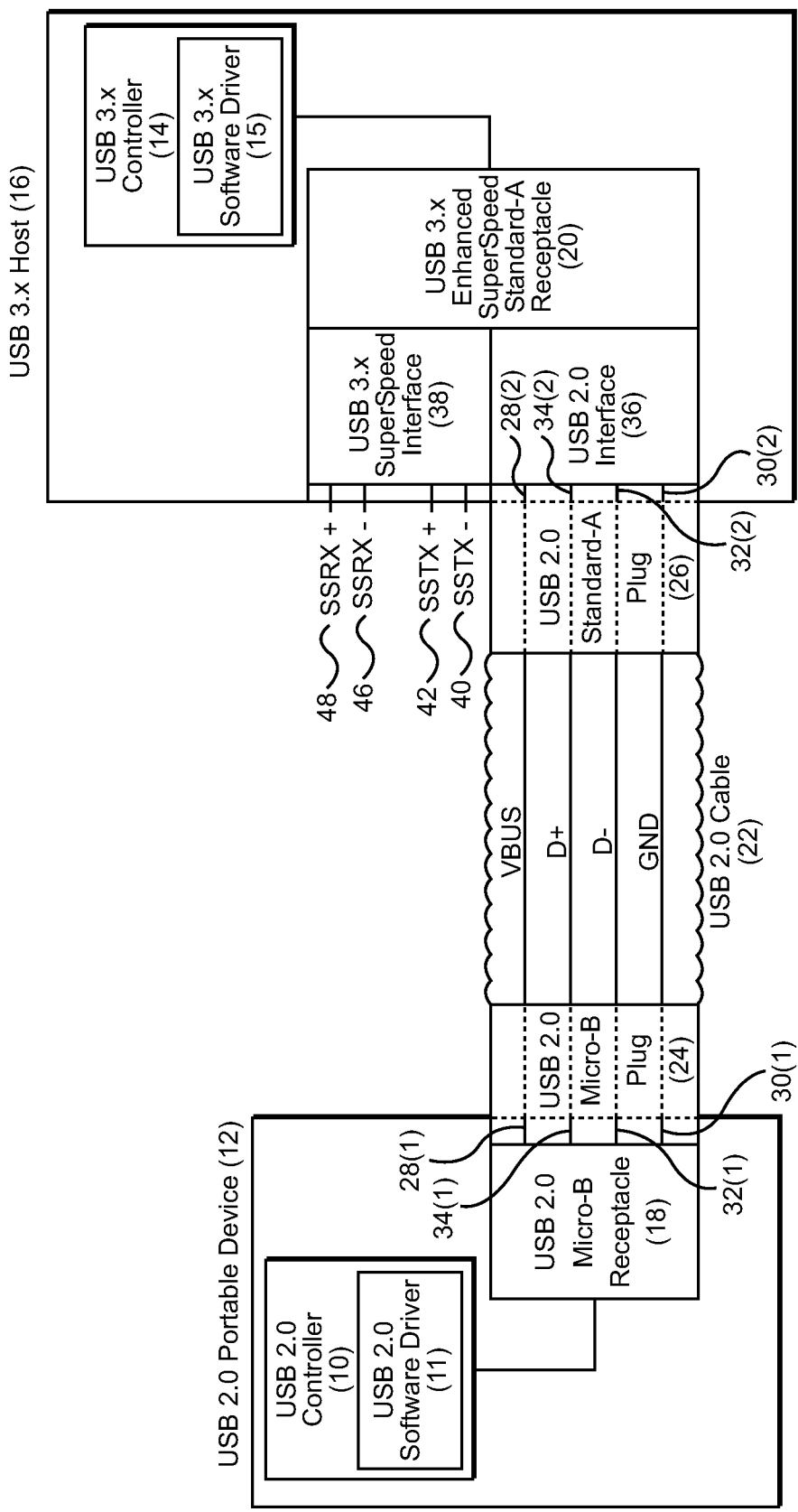
FIG. 1 is a schematic diagram of an exemplary Universal Serial Bus Specification Revision 2.0 (USB 2.0) controller in a USB 2.0 portable device connected to an exemplary USB 3.x controller in a USB 3.x host using a USB 2.0 cable.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include apparatuses, methods, and systems for enabling higher current charging of Universal Serial Bus Specification Revision 2.0 (USB 2.0) portable electronic devices ("USB 2.0 portable device") from USB 3.x hosts. In aspects disclosed herein, it is desired to allow a USB 2.0 portable device connected to a USB 3.x host by a USB 2.0 cable, to draw more charging current than specified under USB 2.0 for the USB 2.0 portable device. A USB 2.0 cable is capable of safely carrying more current than the specified current limit in USB 2.0. However, it is also desired that USB 2.0 portable device remain compliant with USB 2.0 for compatibility and interoperability reasons. For the USB 2.0 portable device to remain compliant with USB 2.0, it is desired that no USB 2.0 data structure formats used to exchange information between the USB 2.0 portable device and the USB 3.x host be altered to enable a higher charging current for USB 2.0 portable electronic devices. Otherwise, such may result in the USB 2.0 portable device being incompatible with USB 2.0 and unable to pass USB 2.0 compliance tests required for USB 2.0 certification.

A data structure is a formatted data container so defined to enable data exchange between a sender and a receiver. For example, the data structure may include a descriptor and a bitmap in USB 2.0 and USB 3.x.

Figure 2:
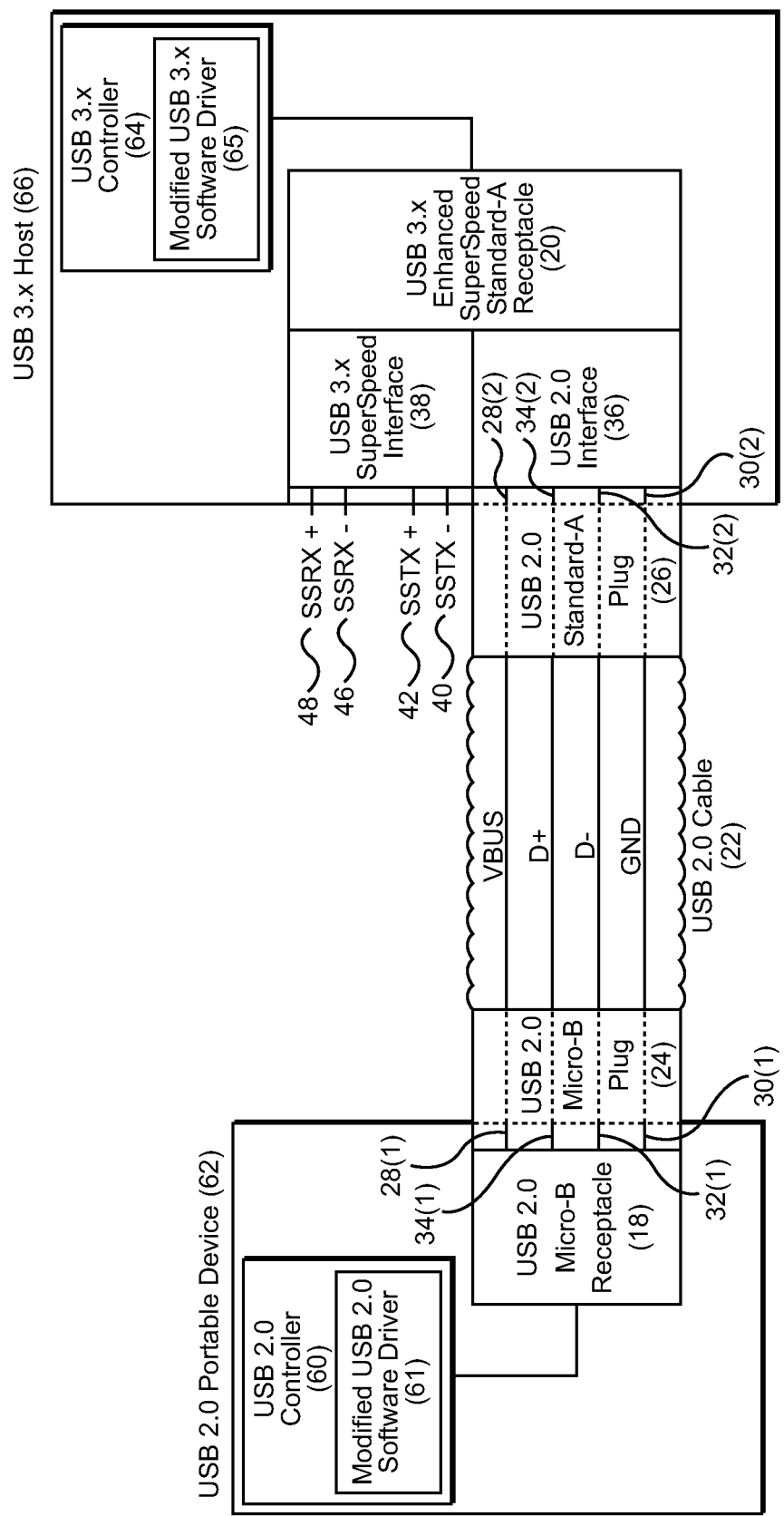
FIG. 2 is a schematic diagram of an exemplary USB 2.0 controller in a USB 2.0 portable device configured to request a higher charging current from a USB 3.x controller in one or more reserved elements of an existing USB 2.0 data structure(s)

In this regard, FIG. 2 illustrates an exemplary USB 2.0 controller 60 with a modified USB 2.0 software driver 61 ("USB 2.0 controller") in a USB 2.0 portable device 62 in this example. The modified USB 2.0 software driver 61 is programmed to control the USB 2.0 controller 60 to operate according to USB 2.0. In addition, the modified USB 2.0 software driver 61 is modified to allow the USB 2.0 portable device 62 to request and draw more charging current than specified under USB 2.0 for the USB 2.0 portable device 62. The USB 2.0 controller 60 is communicatively connected to a USB 3.x controller 64 with a modified USB 3.x software driver 65 in a USB 3.x host 66 through a USB 2.0 cable 22. Similarly, the modified USB 3.x software driver 65 is programmed to control the USB 3.x controller 64 to operate according to USB 3.x. In addition, the modified USB 3.x software driver 65 is modified to allow the USB 3.x host 66 to grant permission for the USB 2.0 portable device 62 to draw more charging current than specified under USB 2.0 for the USB 2.0 portable device 62. When the USB 2.0 portable device 62 is connected to the USB 3.x host 66 by the USB 2.0 cable 22, the USB 2.0 portable device 62 charges its rechargeable battery (not shown) by drawing a charging current from the USB 3.x host 66. USB 2.0 restricts the maximum charging current the USB 2.0 portable device 62 can draw from the USB 3.x host 66 over the USB 2.0 cable 22 (e.g., 500 mA). However, USB 3.x allows the USB 3.x host 66 to provide a higher charging current (e.g. 900 mA) to a connected USB 3.x portable device (not shown), but can only do so over a USB 3.x cable (not shown). The USB 2.0 cable 22 that connects the USB 2.0 portable device 62 to the USB 3.x host 66 is designed to safely carry a charging current higher than 500 mA. In a non-limiting example, the USB 2.0 cable 22 is able to safely carry up to 1500 mA of charging current. Thus, it is desirable to allow the USB 2.0 portable device 62 to draw a higher charging current than specified in the USB 2.0 specification (USB 2.0) (e.g., greater than 500 mA) when connected to the USB 3.x host 66 by the USB 2.0 cable 22, if the USB 2.0 portable device 62 can remain compliant with USB 2.0 by supporting USB 2.0 charging current (e.g., 500 mA).

In this regard, the USB 2.0 controller 60 is provided in the USB 2.0 portable device 62 instead of the USB 2.0 controller 10 in FIG. 1. Also, the USB 3.x controller 64 is provided in the USB 3.x host 66 instead of the USB 3.x controller 14 in FIG. 1. The USB 2.0 controller 60 is programmed by the modified USB 2.0 software driver 61, which is configured to be in compliance with USB 2.0, but includes added "modified" capabilities to request and draw the higher charging current higher than specified in USB 2.0 (e.g., greater than 500 mA) from the USB 3.x controller 64 over the USB 2.0 cable 22. Likewise, the USB 3.x controller 64 is programmed by the modified USB 3.x software driver 65, which is designed to be in compliance with USB 3.x and can provide the higher charging current to the USB 2.0 portable device 62 over the USB 2.0 cable 22. In certain examples discussed in more detail below, the higher charging current can be provided in response to the higher charging current request received from the USB 2.0 controller 60. The USB 2.0 controller 60 is configured to request to draw the charging current higher than 500 mA in response to a USB 2.0 Standard Device Request received from the USB 3.x controller 64. In the aspects discussed in more detail below, the modified USB 2.0 software driver 61 in the USB 2.0 controller 60 and the modified USB 3.x software driver 65 in the USB 3.x controller 64 are programmed to enable the higher charging current to be requested by the USB 2.0 controller 60 and to be drawn from the USB 3.x host 66. However, it is also possible to enable the USB 2.0 controller 60 to request and draw the higher charging current from the USB 3.x host 66 by means of hardware components or a combination of hardware components and software drivers in the USB 2.0 controller 60 and the USB 3.x controller 64, respectively.

To explain exemplary interactions between the USB 2.0 controller 60 and the USB 3.x controller 64 in FIG. 2 to enable a higher charging current to be drawn by the USB 2.0 portable device 62 from the USB 3.x host 66, FIG. 3 is provided. FIG. 3 illustrates an exemplary signaling exchange sequence 68 of USB 2.0 control messages between the USB 2.0 controller 60 of the USB 2.0 portable device 62 and the USB 3.x host 66. The message flow of the exemplary signaling exchange sequence 68 illustrates a series of USB 2.0 control messages for the USB 2.0 controller 60 to request to draw a higher charging current than specified in USB 2.0. Elements of FIG. 2 are referenced in connection with FIG. 3 and will not be re-described here.

With reference to FIG. 3, the USB 2.0 portable device 62 progresses through an attached state 80, a powered state 82, a default state 84, an address state 86, and a configured state 88 when attached to the USB 3.x host 66 by the USB 2.0 cable 22. The USB 2.0 portable device 62 progresses through these states before the USB 2.0 portable device 62 is ready for power charging and data transfer with the USB 3.x host 66. In the attached state 80, the USB 2.0 controller 60 of the USB 2.0 portable device 62 detects an attachment to the USB 2.0 cable 22. In the powered state 82, the USB 2.0 controller 60 is able to draw a charging current up to 100 mA in this example from the USB 3.x host 66 over the USB 2.0 cable 22 in this example, such as specified in USB 2.0. In the default state 84, the USB 2.0 controller 60 waits for a reset from the USB 3.x host 66, which makes the USB 2.0 controller 60 addressable at the default address specified in USB 2.0. In the address state 86, the USB 2.0 controller 60 is assigned a unique address by the USB 3.x host 66 so that data exchange with the USB 3.x host 66 can occur. After receiving the unique address assigned by the USB 3.x host 66, the USB 2.0 controller 60 can request a charging current based on the exemplary signaling exchange sequence 68.

With reference to FIG. 3, after assigning the unique address to the USB 2.0 controller 60 in the address state 86, the USB 3.x controller 64 transmits a USB 2.0 Standard Device Request control message 90 as part of the enumeration procedures defined in USB 2.0. As a non-limiting example, the USB 2.0 Standard Device Request control message 90 is a USB 2.0 GET_DESCRIPTOR/DEVICE control message 71. Upon receipt of the USB 2.0 Standard Device Request control message 90, the USB 2.0 controller 60 in the USB 2.0 portable device 62 sends a USB 2.0 Standard Device Response control message 91, which is a USB 2.0 Device Descriptor control message 72 as an example. The USB 2.0 Device Descriptor control message 72 contains a USB 2.0 DEVICE descriptor as payload. A USB 2.0 DEVICE descriptor format 98 is illustrated in FIG. 4A, which is discussed in more detail below. The USB 3.x controller 64 continues with USB 2.0 enumeration by transmitting a USB 2.0 Standard Configuration Request control message 92, which is a USB 2.0 GET_DESCRIPTOR/CONFIG control message 73 as a non-limiting example. In response, the USB 2.0 controller 60 sends a charging current configuration request 93 to the USB 3.x host 66 over the USB 2.0 cable 22. According to the example in FIG. 3, the charging current configuration request 93 is a USB 2.0 Configuration Descriptor control message 74, which contains a USB 2.0 CONFIGURATION descriptor as payload. A USB 2.0 CONFIGURATION descriptor format 99 is illustrated in FIG. 4B, which is also discussed in more detail below. In the example of FIG. 3, to allow the USB 2.0 controller 60 to request a higher charging current than specified in USB 2.0 from the USB 3.x host 66 over the USB 2.0 cable 22, the USB 2.0 controller 60 is configured to send the charging current configuration request 93 containing two (2) or more USB 2.0 CONFIGURATION descriptors to the USB 3.x host 66. The first USB 2.0 CONFIGURATION descriptor includes a charging current level request of 500 mA specified in USB 2.0 in this example. The second USB 2.0 CONFIGURATION includes a charging current level request greater than 500 mA, for example 900 mA, in a reserved element of the USB 2.0 CONFIGURATION descriptor. A reserved element in a USB 2.0 descriptor is a field or value that is not used, but can be used without altering the descriptor format. Thus, in this example of USB 2.0 descriptors, the USB 2.0 controller 60 can be configured to request a higher charging current from the USB 3.x host 66 using a reserved element in a USB 2.0 descriptor, thus remaining compatible with USB 2.0. More exemplary detail on reserved elements in the USB 2.0 CONFIGURATION descriptor that can be used by the USB 2.0 controller 60 to request a higher charging current than specified in USB 2.0 is described in more detail below with regard to FIGS. 4A, 4B, and 5.

With reference back to FIG. 3, at this point in the signaling exchange sequence 68, the USB 2.0 controller 60 does not have knowledge of whether the USB 3.x host 66 is configured to recognize and process the USB 2.0 CONFIGURATION descriptors encoded with reserved elements to request a higher charging current. In this regard, the USB 3.x controller 64 is configured to send a charging current configuration response 94 to indicate the permitted charging current for the USB 2.0 controller 60 to draw from the USB 3.x host 66. The USB 2.0 controller 60 receives the charging current configuration response 94 from the USB 3.x host 66. The charging current configuration response 94 is a USB 2.0 SET_CONFIGURATION control message 75 in this example. The charging current configuration response 94 contains a specified configuration value that identifies one of the USB 2.0 CONFIGURATION descriptors received from the USB 2.0 controller 60 in the charging current configuration request 93. With reference to the example discussed earlier, the USB 2.0 controller 60 may include two (2) USB 2.0 CONFIGURATION descriptors in the charging current configuration request 93 for the charging current level request of 500 mA and a charging current level request of greater than 500 mA (e.g., 900 mA), respectively. Therefore, the specified configuration value in the charging current configuration response 94 indicates either the charging current level request of 500 mA or the charging current level request of greater than 500 mA (e.g., 900 mA) is permitted. According to USB 2.0, the USB 2.0 controller 60 of the USB 2.0 portable device 62 can start to draw the charging current level identified by the specified configuration value in the charging current configuration response 94 after reaching the configured state 88.

To help describe specific encodings using reserved elements in existing USB 2.0 descriptors, FIGS. 4A and 4B illustrate a USB 2.0 DEVICE descriptor format 98 and a USB 2.0 CONFIGURATION descriptor format 99 as defined in USB 2.0, respectively. Elements of FIG. 2 are referenced in connection with FIGS. 4A and 4B and will not be re-described herein. In the USB 2.0 DEVICE descriptor, a bcdUSB field defines a USB specification release number. For example, USB 2.0, USB 3.0, and the like. A bNumConfigurations field indicates the number of CONFIGURATION descriptors that are going to be sent in the USB 2.0 Configuration Descriptor control message 74 in FIG. 3. In the USB 2.0 CONFIGURATION descriptor, a bMaxPower field indicates a desired charging current level in a unit of 2 mA. For instance, a numeric value fifty (50) in the bMaxPower field indicates a desired charging current of 100 mA (50×2 mA). USB 2.0 defines a maximum value of 250 (0xFA) for the bMaxPower field, which corresponds to 500 mA charging current. The numeric value between 251 (0xFB) (inclusive) and 255 (0xFF) (inclusive) are reserved elements therein. This means there can be up to five (5) USB 2.0 CONFIGURATION descriptors associated with different higher charging current levels in the USB 2.0 Configuration Descriptor control message 74.

Figure 5:
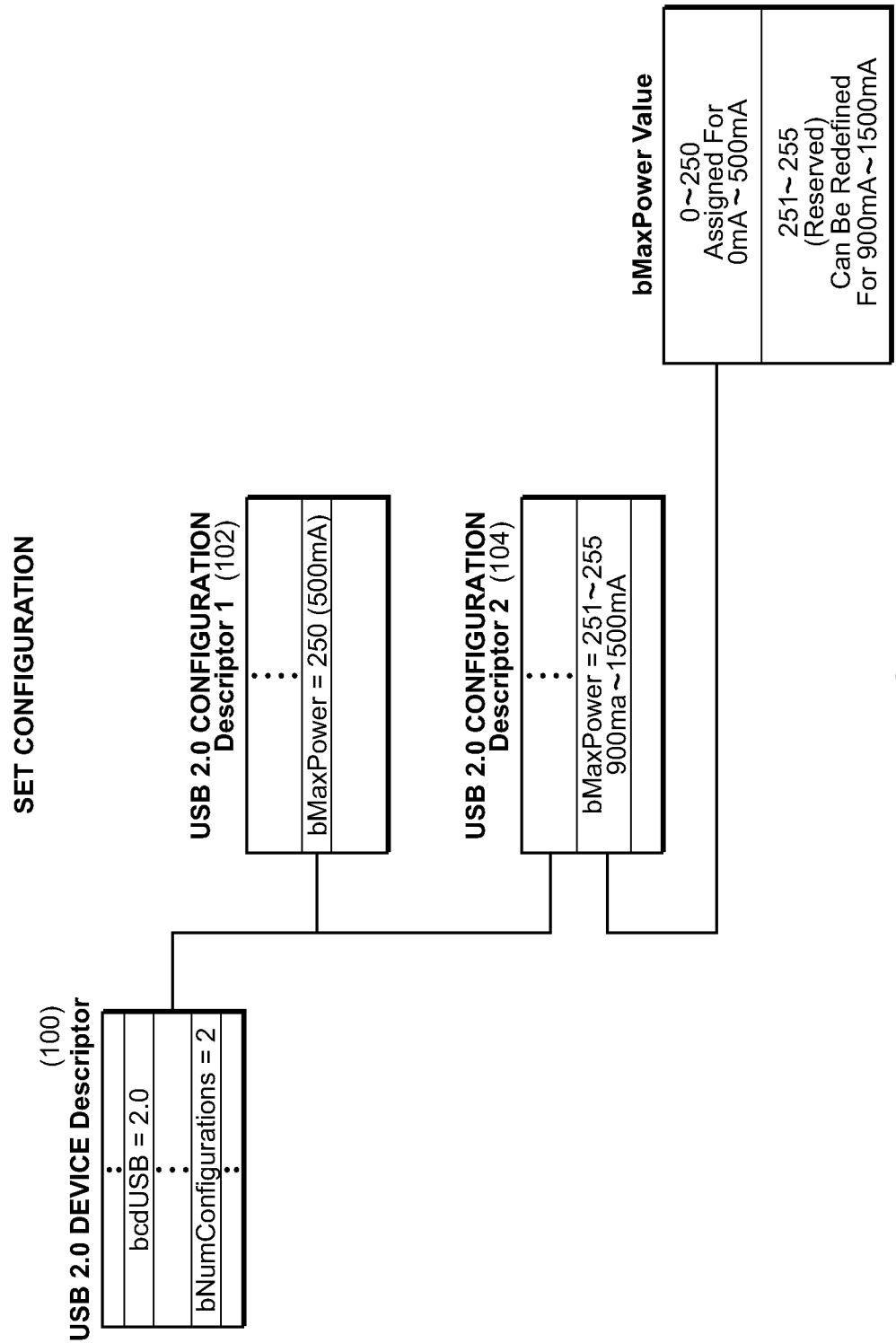
FIG. 5 is a block diagram illustrating an exemplary structure and encoding of the USB 2.0 DEVICE descriptor in FIG. 5A and the USB 2.0 CONFIGURATION descriptor in FIG. 5B that have one or more reserved elements configured to be used by the USB 2.0 controller in FIG. 2 to request to draw the higher charging current from the USB 3.x controller in FIG. 2.

As discussed above with regard to FIG. 3, the USB 2.0 controller 60 is configured to request a higher charging current in one or more reserved elements in a USB 2.0 CONFIGURATION descriptor. The USB 3.x controller 64 is configured to send the charging current configuration response 94 to indicate the permitted charging current for the USB 2.0 controller 60 to draw from the USB 3.x host 66. FIG. 5 illustrates an exemplary encoding method that can be employed by the USB 2.0 controller 60 to request a higher charging current from the USB 3.x host 66 and for the USB 3.x controller 64 to send the charging current configuration response 94 to indicate the permitted charging current.

In this regard, as illustrated in FIG. 5, a USB 2.0 DEVICE descriptor 100, a first USB 2.0 CONFIGURATION descriptor 102, and a second USB 2.0 CONFIGURATION descriptor 104 are illustrated. The USB 2.0 controller 60 can be configured to provide the USB 2.0 DEVICE descriptor 100 having a bcdUSB field configured to indicate USB 2.0 and a bNumConfigurations field configured to indicate two (2) or more USB 2.0 CONFIGURATION descriptors to be used for requesting different higher charging current levels. The USB 2.0 controller 60 can be configured to provide the first USB 2.0 CONFIGURATION descriptor 102 to request the maximum charging current permitted by USB 2.0 (e.g., 500 mA) by a numeric value 250 (0xFA) in a bMaxPower field. To allow the USB 2.0 controller 60 to request a higher charging current than specified in USB 2.0, in this example, the USB 2.0 controller 60 is also configured to provide the second USB 2.0 CONFIGURATION descriptor 104. The second USB 2.0 CONFIGURATION descriptor 104 includes a request for higher charging current higher by setting the bMaxPower field to one of the reserved elements between 251 (0xFB) and 255 (0xFF) without adding any bits to the USB 2.0 CONFIGURATION descriptor 104 format. In this non-limiting example, the numeric value is 255 (0xFF) is designated by the USB 2.0 controller 60 to represent a charging current request of 900 mA.

With continuing reference to FIG. 5, the USB 3.x controller 64 is configured to receive both the first USB 2.0

CONFIGURATION descriptor 102 and the second USB 2.0 CONFIGURATION descriptor 104. The USB 3.x controller 64 can review the charging current requests in both the first USB 2.0 CONFIGURATION descriptor 102 and the second USB 2.0 CONFIGURATION descriptor 104. If the USB 3.x host 66 is configured to recognize the higher charging current request from the USB 2.0 controller 60 in a reserved element in the bMaxPower field in a USB 2.0 CONFIGURATION descriptor, the USB 3.x controller 64 will send the charging current configuration response 94 to the USB 2.0 controller 60 and explicitly identify the requested higher charging current to be drawn from the USB 3.x host 66. If the USB 3.x host 66 is not configured to recognize the higher charging current request from the USB 2.0 controller 60 in a reserved element in the bMaxPower field in a USB 2.0 CONFIGURATION descriptor, the USB 3.x host 66 will ignore the higher charging current request in the second USB 2.0 CONFIGURATION descriptor 104. The USB 3.x host 66 will recognize the charging current request by the USB 2.0 controller 60 in the first USB 2.0 CONFIGURATION descriptor 102 and send the charging current configuration response 94 to explicitly allow the lower charging current up to the specified charging current level in USB 2.0. Thus, by configuring the USB 2.0 controller 60 to request a higher charging current than specified in USB 2.0 using a reserved element in the USB 2.0 CONFIGURATION descriptor, the USB 2.0 controller 60 remains compatible with USB 2.0, but can also request a higher charging current in the event that the USB 3.x host 66 is configured with a USB 3.x controller 64 to recognize the higher charging current request in a reserved element.

It is to be noted that the USB 2.0 controller 60 can be configured to designate the other reserved elements in the bMaxPower field of a USB 2.0 CONFIGURATION descriptor for other higher charging current levels as desired. For example, the numeric value of 254 (0xFE) may be configured to represent a higher charging current of 1500 mA. The USB 3.x controller 64 would have also be configured to understand the reserved elements as the same intended higher charging current as configured in the USB 2.0 controller 60.

Other USB 2.0 data structures beyond the USB 2.0 CONFIGURATION descriptor may also contain reserved elements that can be employed by the USB 2.0 controller 60 of the USB 2.0 portable device 62 to request higher charging current form the USB 3.x host 66 than specified in USB 2.0.

Figure 6:
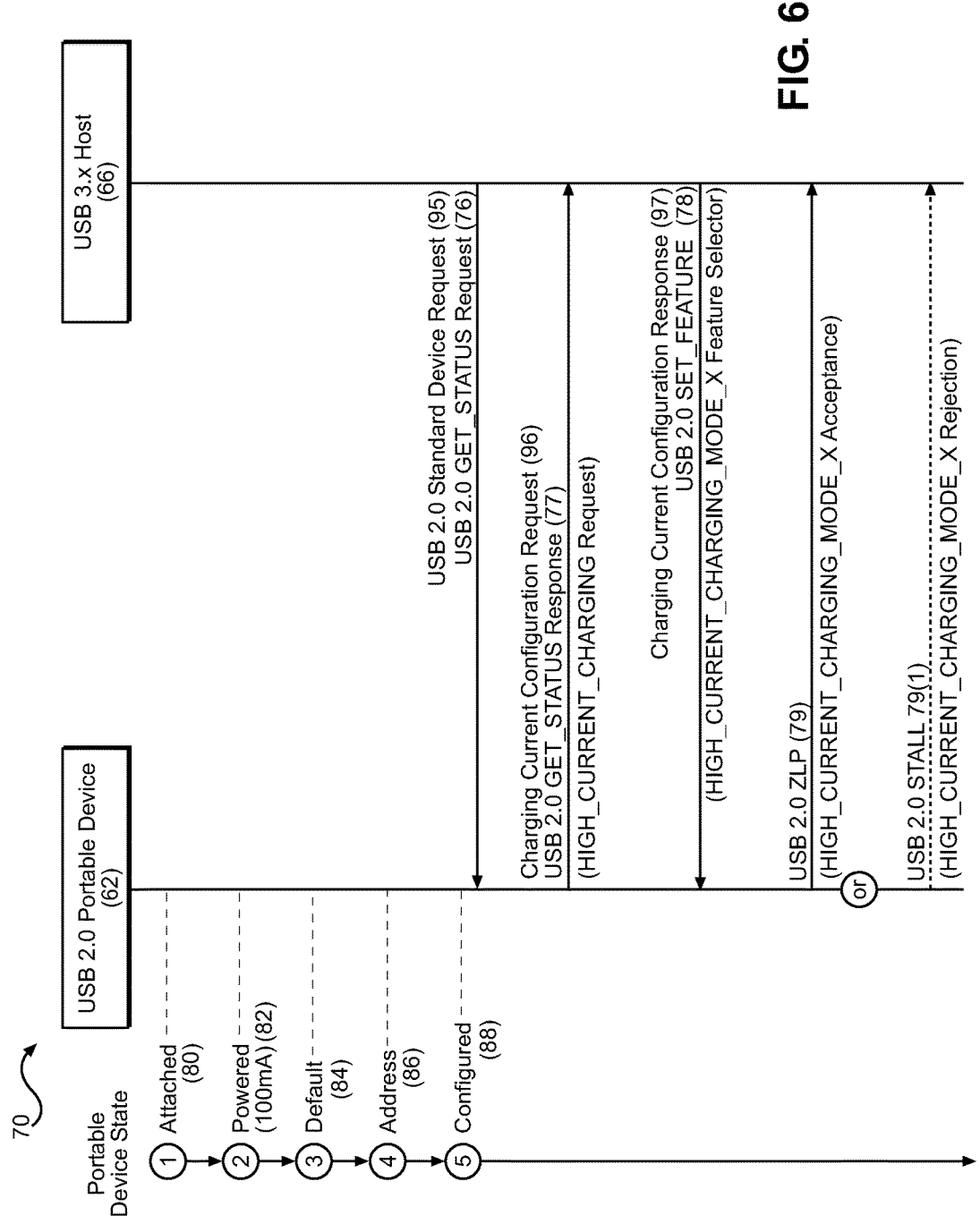
FIG. 6 is a flowchart illustrating another exemplary signaling flow of USB 2.0 control messages and USB 2.0 data structures carried as payloads of USB 2.0 control messages of a USB 2.0 portable device to request to draw a higher charging current than a maximum charging current specified in USB 2.0 from a connected modified USB 3.x host.

With reference back to FIG. 3, the exemplary signaling exchange sequence 68 for requesting and granting the higher charging current begins when the USB 2.0 controller 60 is assigned the unique address in the address state 86, and concludes when the USB 2.0 controller 60 is configured in the configured state 88. In fact, it is also possible for the USB 2.0 controller 60 to request the higher charging current after it has been configured in the configured state 88. FIG. 6 is provided to illustrate an exemplary signaling exchange sequence 70 between the USB 2.0 controller 60 of the USB 2.0 portable device 62 and the USB 3.x host 66 after the USB 2.0 controller 60 is configured in the configured state 88. In this regard, the signaling exchange sequence 70 in FIG. 6 may be conducted in conjunction with or independently from the exemplary signaling exchange sequence 68 in FIG. 3. Elements of FIGS. 2 and 3 are referenced in connection with FIG. 6 and will not be re-described here. If conducted independently from the signaling exchange sequence 68, the signaling exchange sequence 70 may be performed any number of times and at any time, thereby allowing the USB 3.x host 66 to dynamically control charging current.

With reference to FIG. 6, after being configured in the configured state 88, the USB 2.0 controller 60 in the USB 2.0 portable device 62 draws a charging current from the USB 3.x host 66. According to the signaling exchange sequence 68 described in FIG. 3, the charging current drawn by the USB 2.0 controller 60 may be a standard charging current (e.g., 500 mA) or a higher charging current (e.g., 900 mA) if the USB 2.0 controller 60 is configured to request for the higher charging current during USB 2.0 enumeration (e.g., the configuration process takes place between the address state 86 and the configured state 88 in FIG. 3). According to the signaling exchange sequence 70 in FIG. 6, the USB 3.x controller 64 transmits a USB 2.0 Standard Device Request control message 95 to obtain a current status of the USB 2.0 controller 60. As a non-limiting example, the USB 2.0 Standard Device Request control message 95 is a USB 2.0 GET_STATUS Request control message 76. Upon receipt of the USB 2.0 Standard Device Request control message 95, the USB 2.0 controller 60 in the USB 2.0 portable device 62 sends a charging current configuration request 96 to the USB 3.x host 66 over the USB 2.0 cable 22. According to the example in FIG. 6, the charging current configuration request 96 is a USB 2.0 GET_STATUS Response control message 77. The USB 2.0 GET_STATUS Response control message 77 contains a USB 2.0 data structure known as the Information Returned by a GetStatus( ) Request to a Device (hereinafter referred to as "GET_STATUS bitmap" for the convenience of description) as payload. A bitmap is a type of data structure consisting of a plurality of bits. Each of the plurality of bits in the bitmap can have a numeric value of zero (0) or one (1), representing different predefined meanings, respectively. The USB 2.0 GET_STATUS bitmap format and encoding is illustrated in FIG. 7 and is discussed in more detail below. In the example of FIG. 6, to allow the USB 2.0 controller 60 to request a higher charging current than specified in USB 2.0 from the USB 3.x host 66 over the USB 2.0 cable 22, the USB 2.0 controller 60 is configured to send the charging current configuration request 96 containing the GET_STATUS bitmap, in which at least a reserved bit is encoded to request at least a higher than 500 mA charging current, for example 900 mA. A reserved bit in the bitmap is a bit that is not used, but can be used by redefinition without altering the bitmap format. Thus, in this example of the GET_STATUS bitmap, the USB 2.0 controller 60 can be configured to request a higher charging current from the USB 3.x host 66 using a reserved bit in the GET_STATUS bitmap, thus remaining compatible with USB 2.0.

With continuing reference to FIG. 6, the USB 3.x controller 64 is configured to send a USB 2.0 Standard Feature Selector descriptor in a charging current configuration response 97 to grant a permission to the USB 2.0 controller 60 to draw a requested charging current higher than 500 mA that the USB 3.x host 66 is able and willing to provide. According to the example in FIG. 6, the charging current configuration response 97 is a USB 2.0 SET_FEATURE control message 78, which contains the USB 2.0 Standard Feature Selector descriptor in the payload. The USB 2.0 Feature Selector descriptor is another type of data structure. The format and encoding of the USB 2.0 Standard Feature Selector descriptor is illustrated in FIG. 8 and described in detail later in this disclosure. The USB 3.x controller 64 can grant permission to allow the USB 2.0 controller 60 to draw the charging current higher than 500 mA if the USB 2.0 controller 60 is not connected to the USB 3.x host 66 through a USB hub (not shown). Thus, if the USB 2.0 Standard Feature Selector descriptor has a reserved element, the USB 3.x controller 64 could be configured to provide an indication in such reserved element that a higher charging current is permitted to be drawn by the USB 2.0 controller 60. The USB 2.0 controller 60 could be configured to recognize the reserved element in the received USB 2.0 Standard Feature Selector to become aware that the USB 3.x host 66 will permit a higher charging current to be drawn. In response, the USB 2.0 controller 60 can accept the higher charging current granted by the USB 3.x host 66 if desired, or draws the original charging current as configured in the configured state 88 by rejecting the grant. To accept or reject the higher charging current granted by the USB 3.x host 66, the USB 2.0 controller 60 is configured to transmit a USB 2.0 ZLP control message 79 or a USB 2.0 STALL control message 79(1), respectively.

FIG. 7 illustrates an exemplary USB 2.0 Information returned by a GetStatus( ) Request to a Device 105 ("GET_STATUS bitmap"). The exemplary GET_STATUS bitmap 105 has a total of sixteen (16) bits labeled as D0 to D15. Each of the sixteen (16) bits can be encoded with a numeric value zero (0) or one (1) to indicate a predefined meaning. Among the sixteen (16) bits in the exemplary GET_STATUS bitmap 105, bits D0 and D1 are already used by USB 2.0 to identify Self-Powered and Remote-Wakeup statuses, respectively. Bits D2 to D15 are currently reserved and any of the reserved bits can be redefined for requesting a higher than 500 mA charging current. A plurality of reserved bits in the GET_STATUS bitmap 105 may be encoded to request for a plurality of charging current levels that are higher than 500 mA. For example, bit D2 may be used to request for 900 mA charging current, bit D3 may be used to request for 1500 mA charging, and so on. By being configured to recognize the reserved bits in the GET_STATUS bitmap 105, the USB 3.x controller 64 can grant permission to the USB 2.0 controller 60 to draw a corresponding higher charging current using a reserved element in the USB 2.0 Standard Feature Selector descriptor.

In this regard, FIG. 8 illustrates an exemplary encoding method for the USB 3.x controller 64 to encode a grant in a reserved element in the USB 2.0 SET_FEATURE control message 78 for the USB 2.0 controller 60 to draw the requested higher charging current that the USB 3.x host 66 is able and willing to provide. The USB 2.0 controller 60 and the USB 3.x controller 64 could both be configured to agree upon the meaning in terms of charging current level by a specified reserved value provided in the USB 2.0 SET_FEATURE control message 78.

As illustrated in FIG. 8, the USB 2.0 SET_FEATURE control message 78 in FIG. 6 contains a plurality of Standard Feature Selector descriptor 106. The Standard Feature Selector descriptor 106 defined in USB 2.0 include, as a possible feature selector 107, a DEVICE_REMOTE_WAKEUP identified by numeric value one (1) in a value field 108, an END_POINT_HALT feature selector identified by numeric value zero (0) in the value field 108, and a TEST_MODE feature selector identified by numeric value two (2) in the value field 108. Values above two (2) in the value field 108 of the associated feature selector 107 in the Standard Feature Selector descriptor 106 are reserved. Thus, the USB 3.x controller 64 can be configured to include another feature selector 107 representing a higher charging current than is permitted with a reserved value above two (2) in the value field 108. In this example, the USB 3.x controller 64 is configured to provide a HIGH_CURRENT_CHARGING_MODE_X, with X representing a numeric value (e.g., 1, 2, . . . ), as a feature selector 107 in the Standard Feature Selector descriptor 106 with a reserved value of three (3) in the value field 108, as a non-limiting example, if the USB 3.x host 66 will permit the USB 2.0 controller 60 to draw a higher charging current. As a non-limiting example, HIGH_CURRENT_CHARGING_MODE_1 and HIGH_CURRENT_CHARGING_MODE_2 may be configured to represent 900 mA and 1500 mA charging currents, respectively.

If the USB 2.0 controller 60 is configured to recognize the permitted higher charging current in the HIGH_CURRENT_CHARGING_MODE feature selector 107 in the Standard Feature Selector descriptor 106 sent by the USB 3.x controller 64, the USB 2.0 controller 60 can choose to draw the permitted higher charging current from the USB 3.x host 66. Alternatively, the USB 2.0 controller 60 can be configured to ignore the indication of the permitted higher charging current included in the feature selector 107 in the Standard Feature Selector descriptor 106 sent by the USB 3.x controller 64. Or, if the USB 2.0 portable device 62 is not configured to recognize a reserved value in a feature selector 107 in the Standard Feature Selector descriptor 106, the USB 2.0 portable device 62 will not be aware of the permitted higher charging current indicated by the USB 3.x controller 64 as being permitted to be drawn from the USB 3.x host 66, which is equipped with the USB 3.x controller 64 to grant the higher charging current in a reserved element.

The apparatuses, methods, and systems for enabling higher current charging of USB 2.0 portable devices from USB 3.x hosts according to aspects disclosed herein may be applied to enable higher current charging of USB 3.x portable devices from USB 3.x hosts over a USB 2.0 cable or a USB 3.x cable. For USB 3.x portable devices, a similar, but not identical, use of reserved fields will apply.

The apparatuses, methods, and systems to enable higher current charging of USB 2.0 portable devices from USB 3.x hosts according to aspects disclosed herein may also be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 9:
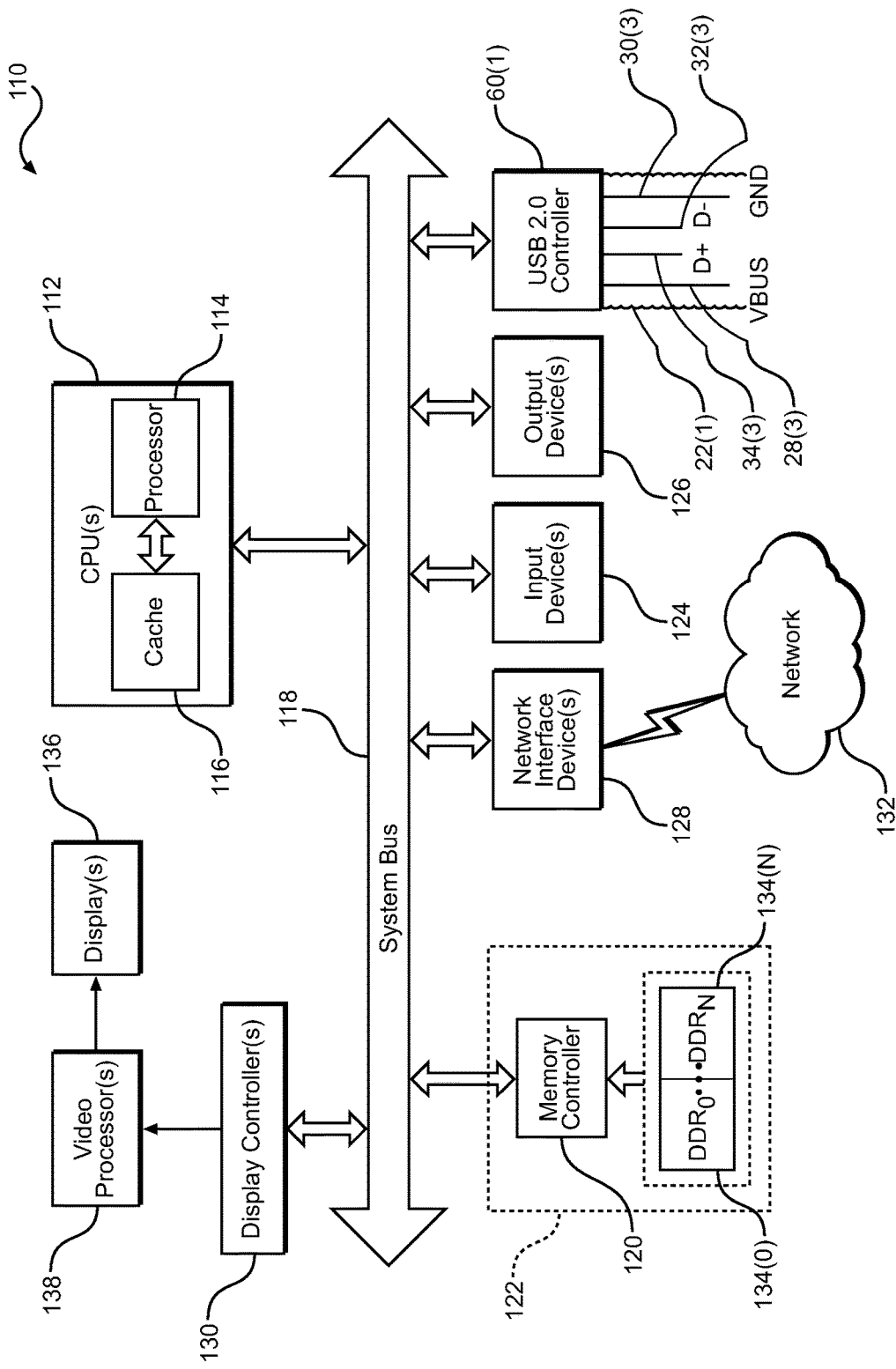
FIG. 9 is a block diagram of an exemplary processor-based portable electronic device that can include the USB 2.0 portable device including the USB 2.0 controller in FIG. 2.

In this regard, FIG. 9 illustrates an example of a processor-based system 110 that can employ the USB 2.0 controller 60 illustrated in FIG. 2. In this example, the processor-based system 110 includes one or more central processing units (CPUs) 112, each including one or more processors 114. The CPU(s) 112 may have cache memory 116 coupled to the processor(s) 114 for rapid access to temporarily stored data. The CPU(s) 112 is coupled to a system bus 118 and can intercouple master and slave devices included in the processor-based system 110. As is well known, the CPU(s) 112 communicates with these other devices by exchanging address, control, and data information over the system bus 118. For example, the CPU(s) 112 can communicate bus transaction requests to a memory controller 120 as an example of a slave device. Although not illustrated in FIG. 8, multiple system buses 118 could be provided, wherein each system bus 118 constitutes a different fabric.

Other master and slave devices can be connected to the system bus 118. As illustrated in FIG. 9, these devices can include a memory system 122, one or more input devices 124, one or more output devices 126, one or more network interface devices 128, and one or more display controllers 130, as examples. The input device(s) 124 can include any type of input device, including but not limited to input keys, switches, voice processors, etc. The output device(s) 126 can include any type of output device, including but not limited to audio, video, other visual indicators, etc. The network interface device(s) 128 can be any devices configured to allow exchange of data to and from a network 132. The network 132 can be any type of network, including but not limited to a wired or wireless network, a private or public network, a local area network (LAN), a wide local area network (WLAN), and the Internet. The network interface device(s) 128 can be configured to support any type of communications protocol desired. The memory system 122 can include one or more memory units 134(0-N).

A USB 2.0 controller 60(1) is another slave device that can be connected to the system bus 118. The USB 2.0 controller 60(1) can be attached to a USB 2.0 cable 22(1), which has at least a VBUS pin 28(3), a GND pin 30(3), a D− pin 32(3), and a D+ pin 34(3). The CPU(s) 112 may be configured to access the USB 2.0 controller 60(1) over the system bus 118 to set or control the function of the USB 2.0 controller 60(1).

The CPU(s) 112 may also be configured to access the display controller(s) 130 over the system bus 118 to control information sent to one or more displays 136. The display controller(s) 130 sends information to the display(s) 136 to be displayed via one or more video processors 138, which process the information to be displayed into a format suitable for the display(s) 136. The display(s) 136 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A Universal Serial Bus Specification Revision 2.0 (USB 2.0) portable device comprising a USB 2.0 controller, wherein:

the USB 2.0 controller comprises a modified USB 2.0 driver configured to request and draw a higher charging current than a maximum charging current specified in USB 2.0 for a USB 2.0 portable device over a USB 2.0 cable configured to sustain the higher charging current; and the USB 2.0 controller is configured to:

detect a connected USB controller in a USB host over the USB 2.0 cable;

send a request to the USB host over the USB 2.0 cable, wherein the request comprises:
   a first USB 2.0 data structure configured to request to draw the maximum charging current specified in the USB 2.0 for the USB 2.0 portable device over the USB 2.0 cable; and
   a second USB 2.0 data structure configured to request in at least one reserved element to draw the higher charging current than the maximum charging current specified in the USB 2.0 for the USB 2.0 portable device over the USB 2.0 cable;
receive a response from the USB host indicating the request to draw the higher charging current is permitted; and
draw the higher charging current over the USB 2.0 cable from the USB host in response to receiving the response from the USB host indicating that the request to draw the higher charging current is permitted.

2. The USB 2.0 portable device of claim 1, wherein the USB 2.0 controller is further configured to draw up to the maximum charging current over the USB 2.0 cable from the USB host in response to receiving the response from the USB host indicating that the request to draw the higher charging current is not permitted.

3. The USB 2.0 portable device of claim 1, wherein the USB 2.0 controller is further configured to send the request to draw the higher charging current in a USB 2.0 Configuration Descriptor control message in response to receiving a USB 2.0 GET_DESCRIPTOR/CONFIG control message.

4. The USB 2.0 portable device of claim 3, wherein the USB 2.0 controller is configured to:
   set a bNumConfigurations field in a USB 2.0 DEVICE Descriptor control message to indicate that a first USB 2.0 CONFIGURATION descriptor and at least one second USB 2.0 CONFIGURATION descriptor are enclosed in the USB 2.0 Configuration Descriptor control message;
   include the first USB 2.0 CONFIGURATION descriptor as the first USB 2.0 data structure in the USB 2.0 Configuration Descriptor control message to request to draw the maximum charging current specified in the USB 2.0 for the USB 2.0 portable device over the USB 2.0 cable; and
   include the at least one second USB 2.0 CONFIGURATION descriptor as the second USB 2.0 data structure in the USB 2.0 Configuration Descriptor control message to request to draw the higher charging current than the maximum charging current specified in the USB 2.0 for the USB 2.0 portable device over the USB 2.0 cable.

5. The USB 2.0 portable device of claim 4, wherein the USB 2.0 controller is configured to:
   include the first USB 2.0 CONFIGURATION descriptor in the USB 2.0 Configuration Descriptor control message by being further configured to include the maximum charging current specified in the USB 2.0 in a bMaxPower field in the first USB 2.0 CONFIGURATION descriptor; and
   include the at least one second USB 2.0 CONFIGURATION descriptor in the USB 2.0 Configuration Descriptor control message by being further configured to include the higher charging current than the maximum charging current specified in the USB 2.0 in a bMaxPower field in the at least one second USB 2.0 CONFIGURATION descriptor.

6. The USB 2.0 portable device of claim 5, wherein the USB 2.0 controller is further configured to indicate 500 milliamps (mA) in the bMaxPower field in the first USB 2.0 CONFIGURATION descriptor.

7. The USB 2.0 portable device of claim 5, wherein the higher charging current than the maximum charging current specified in the USB 2.0 is above 500 milliamps (mA) and equal to or less than 1500 mA.

8. The USB 2.0 portable device of claim 5, wherein the USB 2.0 controller is configured to include the higher charging current in the bMaxPower field in the at least one second USB 2.0 CONFIGURATION descriptor by being further configured to set the bMaxPower field to at least one reserved value between 251 (0xFB) and 255 (0xFF) indicative of the higher charging current than the maximum charging current specified in the USB 2.0.

9. The USB 2.0 portable device of claim 8, wherein the USB 2.0 controller is further configured to set the bMaxPower field to the at least one reserved value between 251 (0xFB) and 255 (0xFF) indicative of the higher charging current than the maximum charging current specified in the USB 2.0 that is above 500 milliamps (mA) and equal to or less than 1500 mA.

10. The USB 2.0 portable device of claim 1, wherein the USB 2.0 controller is further configured to receive the response from the USB host by being configured to receive a USB 2.0 SET_CONFIGURATION control message from the USB host indicating whether the request to draw the higher charging current is permitted in a reserved value.

11. The USB 2.0 portable device of claim 1, wherein the USB 2.0 controller is further configured to send the request in a USB 2.0 GET_STATUS Response control message in response to receiving a USB 2.0 GET_STATUS Request control message.

12. The USB 2.0 portable device of claim 11, wherein the USB 2.0 controller is further configured to send the request by being configured to set at least one reserved bit in a USB 2.0 information returned by a GetStatus( ) Request to a device data structure in the USB 2.0 GET_STATUS Response control message.

13. The USB 2.0 portable device of claim 12, wherein the higher charging current is above 500 milliamps (mA) and equal to or less than 1500 mA.

14. The USB 2.0 portable device of claim 12, wherein the USB 2.0 controller is further configured to set the at least one reserved bit between D2 and D15 in the USB 2.0 information returned by the GetStatus( ) Request to the device data structure indicative of the higher charging current than the maximum charging current specified in the USB 2.0 that is above 500 milliamps (mA) and equal to or less than 1500 mA.

15. The USB 2.0 portable device of claim 11, wherein the USB 2.0 controller is further configured to receive a grant in the at least one reserved element of the second USB 2.0 data structure in a USB 2.0 SET_FEATURE control message.

16. The USB 2.0 portable device of claim 15, wherein the USB 2.0 controller is further configured to receive the grant in the at least one reserved element comprising a HIGH_CURRENT_CHARGING_MODE feature selector.

17. The USB 2.0 portable device of claim 11, wherein the USB 2.0 controller is further configured to send a USB 2.0 control message to the USB host indicating a grant to draw the higher charging current is accepted.

18. The USB 2.0 portable device of claim 17, wherein the USB 2.0 controller is further configured to send a USB 2.0 ZLP control message to the USB host when the grant to draw the higher charging current is accepted.

19. The USB 2.0 portable device of claim 17, wherein the USB 2.0 controller is further configured to send a USB 2.0 STALL control message to the USB host when the grant to draw the higher charging current is not accepted.

20. The USB 2.0 portable device of claim 1 integrated into a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

21. A method of a Universal Serial Bus Specification Revision 2.0 (USB 2.0) portable device drawing a higher charging current from a USB host, comprising:
   providing a modified USB 2.0 driver in a USB 2.0 controller, the modified USB 2.0 driver configured to request and draw a higher charging current than a maximum charging current specified in USB 2.0 for a USB 2.0 portable device over a USB 2.0 cable configured to sustain the higher charging current;
   detecting a connected USB controller in a USB host over the USB 2.0 cable;
   sending a request to the USB host over the USB 2.0 cable, wherein the request comprises:
      a first USB 2.0 data structure configured to request to draw the maximum charging current specified in the USB 2.0 for the USB 2.0 portable device over the USB 2.0 cable; and
      a second USB 2.0 data structure configured to request in at least one reserved element to draw the higher charging current than the maximum charging current specified in the USB 2.0 for the USB 2.0 portable device over the USB 2.0 cable;
   receiving a response from the USB host indicating the request to draw the higher charging current is permitted; and
   drawing the higher charging current over the USB 2.0 cable from the USB host in response to receiving the response from the USB host indicating that the request to draw the higher charging current is permitted.

22. The method of claim 21, further comprising drawing up to the maximum charging current over the USB 2.0 cable from the USB host in response to receiving the response from the USB host indicating that the request to draw the higher charging current is not permitted.

23. The method of claim 21, further comprising sending the request to draw the higher charging current in a USB 2.0 Configuration Descriptor control message.

24. The method of claim 23, further comprising:
   setting a bNumConfigurations field in a USB 2.0 DEVICE descriptor control message to indicate that a first USB 2.0 CONFIGURATION descriptor and at least one second USB 2.0 CONFIGURATION descriptor are enclosed in a USB 2.0 SET_CONFIGURATION control message;
   including the first USB 2.0 CONFIGURATION descriptor as the first USB 2.0 data structure in the USB 2.0 Configuration Descriptor control message to request to draw the maximum charging current specified in the USB 2.0 for the USB 2.0 portable device over the USB 2.0 cable; and
   including the at least one second USB 2.0 CONFIGURATION descriptor as the second USB 2.0 data structure in the USB 2.0 Configuration Descriptor control message to request to draw the higher charging current than the maximum charging current specified in the USB 2.0 for the USB 2.0 portable device over the USB 2.0 cable.

25. The method of claim 24, wherein:
   including the first USB 2.0 CONFIGURATION descriptor in the USB 2.0 Configuration Descriptor control message comprises including the maximum charging current specified in the USB 2.0 in a bMaxPower field in the first USB 2.0 CONFIGURATION descriptor; and
   including the at least one second USB 2.0 CONFIGURATION descriptor in the USB 2.0 Configuration Descriptor control message comprises including the higher charging current than the maximum charging current specified in the USB 2.0 in a bMaxPower field in the at least one second USB 2.0 CONFIGURATION descriptor.

26. The method of claim 21, comprising receiving a USB 2.0 SET_CONFIGURATION control message from the USB host indicating whether the request to draw the higher charging current is permitted in a reserved value.

27. A system for charging a Universal Serial Bus Specification Revision 2.0 (USB 2.0) portable device from a USB host, comprising:
   a USB 2.0 portable device, comprising:
      a USB 2.0 controller comprising a modified USB 2.0 driver configured to request and draw a higher charging current than a maximum charging current specified in USB 2.0 for the USB 2.0 portable device over a USB 2.0 cable configured to sustain the higher charging current, the USB 2.0 controller configured to:
         detect a connected USB controller in a USB host over the USB 2.0 cable;
         send a request to the USB host over the USB 2.0 cable, wherein the request comprises:
            a first USB 2.0 data structure configured to request to draw the maximum charging current specified in the USB 2.0 for the USB 2.0 portable device over the USB 2.0 cable; and
            a second USB 2.0 data structure configured to request in at least one reserved element to draw the higher charging current than the maximum charging current specified in the USB 2.0 for the USB 2.0 portable device over the USB 2.0 cable;
         receive a response from the USB host indicating the request to draw the higher charging current is permitted; and
         draw the higher charging current over the USB 2.0 cable from the USB host in response to receiving the response from the USB host indicating that the request to draw the higher charging current is permitted; and
      a USB 2.0 receptacle configured to engage a first USB 2.0 plug attached to the USB 2.0 cable for connecting to the USB host; and
   a USB 3.x host, comprising:
      a USB 3.x controller configured to:
         detect the USB 2.0 controller in the USB 2.0 portable device over the USB 2.0 cable;
         receive the request from the USB 2.0 controller over the USB 2.0 cable;
         send a response to the USB 2.0 controller indicating the request to draw the higher charging current is permitted; and provide the higher charging current over the USB 2.0 cable to the USB 2.0 portable device when a grant to draw the higher charging current is accepted; and a USB 3.x receptacle configured to engage a second USB 2.0 plug attached to the USB 2.0 cable for connecting to the USB 2.0 portable device; and the USB 2.0 cable comprising the first USB 2.0 plug on one end of the USB 2.0 cable and the second USB 2.0 plug on another end of the USB 2.0 cable.

28. The system of claim 27, wherein the USB 3.x controller is further configured to recognize a bMaxPower field in a USB 2.0 CONFIGURATION descriptor including at least one reserved value between 251 (0xFB) and 255 (0xFF) indicating the requested higher charging current.

29. The system of claim 27, wherein the USB 3.x controller is further configured to recognize a reserved bit between D2 and D15 in information returned in response to a USB 2.0 GetStatus( ) Request indicating the requested higher charging current.

30. The USB 2.0 portable device of claim 1, further configured to:

receive the response from the USB host indicating in the at least one reserved element of the second USB 2.0 data structure that the request to draw the higher charging current is permitted; and draw the higher charging current over the USB 2.0 cable from the USB host in response to receiving the response from the USB host indicating that the request to draw the higher charging current is permitted.

* * * * *